United States Patent
Klemm et al.

(10) Patent No.: US 11,240,215 B2
(45) Date of Patent: Feb. 1, 2022

(54) TEMPORARY CONTROL OF COMPONENTS USING LOCATION BASED GRANTS

(71) Applicant: Avaya Inc., Santa Clara, CA (US)

(72) Inventors: Reinhard Klemm, Basking Ridge, NJ (US); Parameshwaran Krishnan, Basking Ridge, NJ (US); Navjot Singh, Somerset, NJ (US)

(73) Assignee: AVAYA INC., Santa Clara, CA (US)

( * ) Notice: Subject to any disclaimer, the term of this patent is extended or adjusted under 35 U.S.C. 154(b) by 588 days.

(21) Appl. No.: 15/095,904

(22) Filed: Apr. 11, 2016

(65) Prior Publication Data

US 2017/0295169 A1    Oct. 12, 2017

(51) Int. Cl.
| | | |
|---|---|---|
| *H04L 29/06* | (2006.01) | |
| *H04W 12/06* | (2021.01) | |
| *H04L 29/08* | (2006.01) | |
| *H04W 4/021* | (2018.01) | |
| *H04W 12/63* | (2021.01) | |

(52) U.S. Cl.
CPC ........ *H04L 63/0492* (2013.01); *H04L 67/025* (2013.01); *H04W 4/021* (2013.01); *H04W 12/06* (2013.01); *H04L 63/0823* (2013.01); *H04L 63/107* (2013.01); *H04W 12/63* (2021.01)

(58) Field of Classification Search
CPC . H04L 63/0853; H04L 63/10; H04L 63/0492; H04L 63/0823; H04L 63/107; H04W 12/08; H04W 12/06; H04W 12/63
See application file for complete search history.

(56) References Cited

U.S. PATENT DOCUMENTS

| | | | | |
|---|---|---|---|---|
| 8,380,176 | B2* | 2/2013 | Adler | H04M 3/42178 370/328 |
| 8,688,779 | B2* | 4/2014 | Bocking | H04W 4/029 709/204 |
| 9,124,584 | B2* | 9/2015 | Hirsch | H04L 63/0492 |
| 9,280,559 | B1* | 3/2016 | Jones | H04L 61/1582 |
| 9,332,392 | B1* | 5/2016 | Conway | H04W 4/025 |
| 9,762,722 | B2* | 9/2017 | Bostick | H04M 1/72577 |

(Continued)

OTHER PUBLICATIONS

Q. Li, H. Wu, L. Liu, B. Pan and L. Dong, "A Group based Dynamic Mix Zone Scheme for Location Privacy Preservation in VANETs," 2018 Third International Conference on Security of Smart Cities, Industrial Control System and Communications (SSIC), 2018, pp. 1-5. (Year: 2018).*

(Continued)

*Primary Examiner* — Kari L Schmidt

(57) ABSTRACT

A device, system, and method gives temporary control of a user device using location based grants. The method performed by a control server of a third party is performed when the user device is in a predetermined area. The method includes transmitting authentication data to the user device, the authentication data configured to authenticate the third party to the user device, the predetermined area being associated with the third party. The method includes receiving a request from the user device for command data, the command data configured to be executed on the user device to provide the third party with a limited control over the user device while the user device remains in the predetermined area. The method includes transmitting the command data to the user device.

20 Claims, 5 Drawing Sheets

(56) References Cited

U.S. PATENT DOCUMENTS

| | | | | |
|---|---|---|---|---|
| 2008/0270612 | A1* | 10/2008 | Malakapalli | H04L 63/029 709/227 |
| 2010/0229217 | A1* | 9/2010 | Bhatia | H04M 1/72525 726/4 |
| 2010/0311336 | A1* | 12/2010 | Huotari | H04M 1/72572 455/41.3 |
| 2013/0060635 | A1* | 3/2013 | Walker | G06Q 30/0261 705/14.58 |
| 2013/0191885 | A1* | 7/2013 | Hubner | G06F 21/6218 726/5 |
| 2014/0007117 | A1* | 1/2014 | Sima | G06F 8/65 718/102 |
| 2014/0162598 | A1* | 6/2014 | Villa-Real | G06Q 20/363 455/411 |
| 2014/0310771 | A1* | 10/2014 | Marshall | G06F 21/6218 726/2 |
| 2014/0331272 | A1* | 11/2014 | Gupta | H04L 63/20 726/1 |
| 2015/0056915 | A1* | 2/2015 | Brisebois | H04K 3/42 455/1 |
| 2015/0180746 | A1* | 6/2015 | Day, II | H04L 51/16 455/405 |
| 2015/0264521 | A1* | 9/2015 | Venkatraman | H04W 4/02 455/411 |
| 2015/0319178 | A1* | 11/2015 | Desai | H04W 12/08 726/1 |
| 2015/0372832 | A1* | 12/2015 | Kortz | G05B 15/02 700/278 |
| 2016/0021199 | A1* | 1/2016 | Krimon | H04L 67/18 709/225 |
| 2016/0044504 | A1* | 2/2016 | Edge | H04W 64/00 455/456.3 |
| 2016/0157239 | A1* | 6/2016 | Kalderen | H04L 47/11 370/329 |
| 2016/0316328 | A1* | 10/2016 | Baran | H04W 8/02 |
| 2017/0094463 | A1* | 3/2017 | Baran | H04W 4/021 |
| 2017/0149795 | A1* | 5/2017 | Day, II | H04L 63/108 |
| 2019/0026482 | A1* | 1/2019 | Kenny | G06F 21/604 |
| 2019/0036975 | A1* | 1/2019 | Beckman | H04L 67/02 |
| 2019/0312737 | A1* | 10/2019 | Mani | G07C 9/00563 |

OTHER PUBLICATIONS

Gambs, Sebastien, et al. "Locanyms: Towards privacy-preserving location-based services." Proceedings of the 1st European Workshop on AppRoaches to MObiquiTous Resilience. 2012, pp. 1-6. (Year: 2012).*

P. Rula and F. E. Bustamante, "Crowdsensing Under (Soft) Control," 2015 IEEE Conference on Computer Communications (INFOCOM), 2015, pp. 2236-2244. (Year: 2015).*

\* cited by examiner

TEMPORARY CONTROL OF COMPONENTS USING LOCATION BASED GRANTS

BACKGROUND

A user device utilized by a user may execute a plurality of applications by using a plurality of different components that provide a plurality of different functionalities and features. For example, the user device may include a phone application in which a transceiver enables a connection to be established with a further user device utilized by a further user. The user and the further user may speak to each other via an audio output device to hear audio and an audio input device to receive audio. The phone application may also have an alert mechanism in which the audio output device may play a sound or ring tone and/or a vibration mechanism vibrates the user device to notify the user when a call is incoming.

The user generally has sole control over how the applications operate by enabling or disabling the functionalities/features and/or the components used by the applications. For example, the phone application may effectively be disabled by deactivating the transceiver. In another example, the phone application may disable the audio output device from being used when an incoming call is received through a manual setting on the phone application or on the user device (e.g., mute function). Accordingly, if the application and/or the user device includes settings which may be manipulated by the user, the user may manually control how the settings are set by inputting a corresponding command. However, a third party who wishes to have certain settings to be made on the user device must rely on the user to manually change the settings on the user device.

BRIEF SUMMARY

The exemplary embodiments are directed to a method comprising: when a user device is in a predetermined area: transmitting, by a control server of a third party, authentication data to the user device, the authentication data configured to authenticate the third party to the user device, the predetermined area being associated with the third party; receiving, by the control server, a request from the user device for command data, the command data configured to be executed on the user device to provide the third party with a limited control over the user device while the user device remains in the predetermined area; and transmitting, by the control server, the command data to the user device.

DETAILED DESCRIPTION

Figure 1:
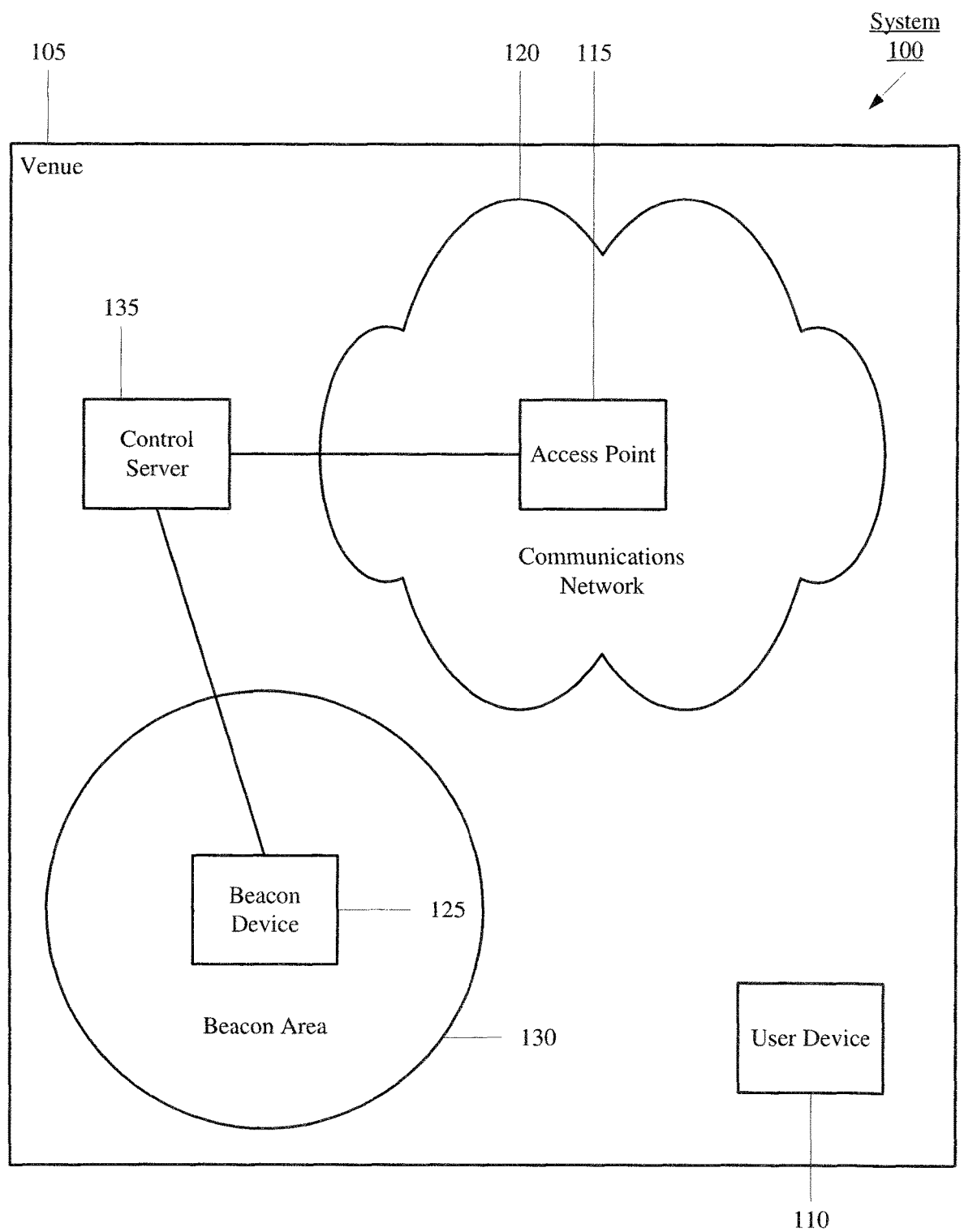
FIG. 1 shows an exemplary system according to the present disclosure.

The exemplary embodiments may be further understood with reference to the following description and the related appended drawings, wherein like elements are provided with the same reference numerals. The exemplary embodiments are related to a device, a system, and a method for providing control to a third party to disable or enable components of a user device utilized by a user. Specifically, the user device may be configured to receive one or more commands to enable or disable components of the user device from the third party. The exemplary embodiments provide a mechanism in which an authentication of the third party and a valid location determination allows the third party to transmit commands to the user device for the enabling/disabling of the components to be performed in an automatic manner without any intervention from the user.

A user device may execute a plurality of applications using a plurality of different components. The user device may also be mobile to enable the user to carry the user device to various different locations. However, a location may recommend or require that certain functionalities or features are to be disabled or enabled while within an area of the location. For example, a movie theater may recommend that an audio output component is to be disabled, particularly while a show is being played. In another example, the movie theater may require that a camera and/or an audio input component is to be disabled while a show in progress. In a further example, a location may require that the user device itself be completely disabled while within the area of that location. As the components of the user device are under the manual control of the user, the user must manually enter the settings functionalities to enable or disable the components while within an area of the location recommending or requiring certain policies for use of the user device.

To provide more efficient manners of enabling or disabling components, especially when the enabling/disabling manual act is performed routinely (e.g., muting the user device while the user intends to sleep), the user device may include a schedule application that enables/disables the components in an automated manner. The schedule application receives inputs from the user to control the enabling/disabling of the components based on predetermined times. However, ultimately, the enabling and disabling of the components based on a time require a manual entry from the user. Accordingly, the user must enter the time and select components which are to be disabled/enabled for the automatic control to be performed. That is, the third party wishing a particular setting on the user device must rely on the user making the change to the setting.

In another criteria, a location may provide the basis upon which the automatic enabling or disabling of the components is performed. Specifically, an application may control whether a camera application or the camera component is enabled or disabled based upon the location of the user device. However, in a substantially similar manner to the schedule application, the user must enter the locations into the application to decide whether the camera is to be enabled or disabled. That is, ultimately, the enabling and disabling of the components based on a location require a manual entry from the user. Accordingly, the user must enter the location and select which components are to be disabled/enabled for the automatic control to be performed. That is, the third party wishing a particular setting on the user device must rely on the user making the change to the setting.

The exemplary embodiments provide a mechanism that enables a third party to control how a user device, utilized by a user, operates without any user intervention from the user except for an initial approval of the third party. That is, the third party may select applications, components, and/or functionalities that are allowed or not allowed to be used. The third party may represent an entity that sets policies for an area of a location regarding use of electronic devices while in the area. The policies may represent whether applications and/or components are to be deactivated or downgraded while the user device is in the area.

Specifically, the exemplary embodiments provide a control server for the third party where select applications, components, and/or functionalities/operations of a user device are restricted from use or required to be used. When the user device is disposed in the predetermined area associated with the third party, the control server may detect the user device or the user device may recognize the control server. Therefore, verification of the control server and the location of the third party may provide the limited control by the third party over the user device. Accordingly, the control exerted by the third party may be a limited control such that the user is not completely incapable of using the user device. Specifically, the exemplary embodiments include a time restriction (i.e., a temporary control during the time the user device is in the area), a geographic restriction (i.e., only while within the area), and a functionality restriction (i.e., control of selected or limited applications, components, or functionalities). However, it should be noted that the exemplary embodiments may also be modified for a complete control of the user device by the third party.

It is noted that there may be two types of users. A first type of user is a non-compliant user who does not cooperate with recommended and/or required activation/deactivation procedures of a location overseen by a third party. A second type of user is a compliant user who does cooperate and performs recommended and required procedures. As will be described in further detail below, the user device utilizes an initial operation performed by the user for the mechanism according to the exemplary embodiments to be performed by the third party. Therefore, the exemplary embodiments relate to the second type of user who is the compliant user.

FIG. 1 shows an exemplary system 100 according to the present disclosure. The system 100 may represent a plurality of components utilized by a third party for a venue 105 in which a user device 110 may be disposed in an area of the venue 105. The components in the system 100 may therefore interact with the user device 110 for the mechanism of third party control according to the exemplary embodiments to be performed. As will be described in further detail below, the third party may define commands to be performed by the user device 110, while in the area of the venue 105 using one or more different mechanisms to exchange data with the user device 110. The system 100 may include the venue 105, the user device 110, an access point 115, a communications network 120, a beacon device 125, a beacon area 130, and a control server 135.

The venue 105 may be any location having an area which is to have policies set by the third party regarding usage of user devices located therein. As noted above, the policies may indicate the components, the applications, the functionalities, and/or the operations that are to be either activated/deactivated or upgraded/degraded. For exemplary purposes, the description herein will be described with regard to the deactivation or degraded operation. However, those skilled in the art will understand that the activation operation may be performed in a substantially similar manner should the third party set such a policy.

The venue 105 may be any type of geographic location in which policies for usage of user devices disposed in the area of the geographic location may be utilized. For example, the venue 105 may be a theater, an arena, a court house, customs, a locker room, an airplane, a security area, a classroom, etc. When viewed two-dimensionally, the area of the venue 105 in which the policies are associated may be any size and shape. For example, the venue 105 may have a total area and the entirety of the total area may have the policies associated. In another example, the venue 105 may have a total area but only select areas may have the policies associated. A substantially similar feature may be applied for three dimensions. For example, when the venue 105 is a building, the entire building may have the policies associated. In another example, only select floors of the building or portions of select floors may have the policies associated.

Figure 2:
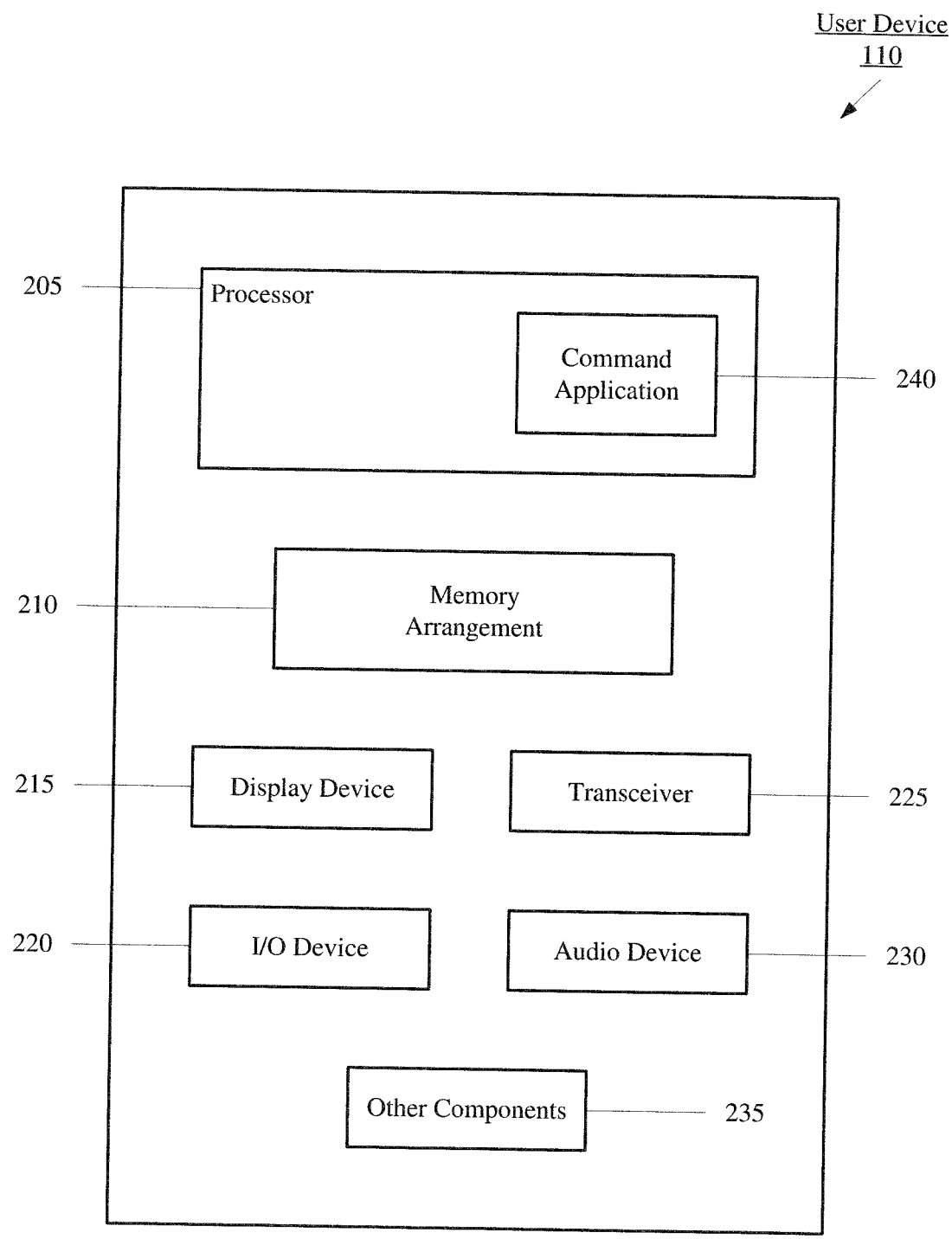
FIG. 2 shows an exemplary user device of the system of FIG. 1 according to the present disclosure.

The user device 110 may be any electronic device disposed in an area of the venue 105 utilized by a user who is present in the area of the venue 105. FIG. 2 shows an exemplary embodiment of the user device 110 of the system of FIG. 1 according to the present disclosure. The user device 110 may include a plurality of components and have a plurality of applications installed thereon for various functionalities, features, and operations to be performed manually by the user or automatically by the user device 110.

The user device 110 may represent any electronic device that is configured to perform the functionalities described herein. Specifically, the user device 110 may be a portable device such as a tablet, a smartphone, a laptop, a wearable, etc. The user device 110 may include the necessary software, hardware, and/or firmware required to perform the operations described for the exemplary embodiments. Specifically, the user device 110 may include a processor 205, a memory arrangement 210, a display device 215, an input/output (I/O) device 220, a transceiver 225, an audio device 230, and other components 235 (e.g., an imager, a battery, a data acquisition device, ports to electrically connect the user device 110 to other electronic devices, etc.).

The processor 205 may be configured to execute a plurality of applications of the user device 110. For example, the processor 205 may execute a web browser when connected to the communications network 110 via the transceiver 225. In another example, the processor 205 may execute a communications functionality such as a call application (e.g., to establish a voice communication), a chat application (e.g., to establish a chat communication), a video application (e.g., to establish a video communication), etc. Each of these applications may utilize the components of the user device 110 such as the display device 215, the audio device 230, etc.

In a further example, the processor 205 may execute a command application 240. As will be described in further detail below, the command application 240 may provide a user side operation interacting with the control server 135 to perform the limited control by the third party according to the exemplary embodiments. The command application 240 may be configured to receive data from the user and data from further devices such as the control server 135.

As noted above, the user may only be required to perform an initial action for the mechanisms according to the exemplary embodiments to be performed where a third party has limited control of the user device 110. The initial action may be the installation of the command application 240. It is noted that the command application 240 may be a user-installed application. That is, the user may be a compliant user who manually and voluntarily installs the command application 240. The command application 240 may also be configured to constantly run at least in a background capacity upon installation or may be manually executed to start running. However, to cover even non-compliant users, the user device 110 may include a tamper-proof hardware component, firmware component, and/or software component embodied as the command application 240 which also runs constantly at least in a background capacity. The use or purchase of the user device 110 may accordingly be supplied with an indication that the command application 240 has been pre-installed and is used with the user device 110. However, it should be noted that the command application 240 may also be configured with a master switch that enables or disables the mechanism according to the exemplary embodiments.

With the command application 240 installed and running on the user device 110, the user device 110 may receive authentication data from the third party via the control server 135. For example, via the transceiver 225, the command application 240 may listen for the authentication data that may be broadcast by the control server 135. In another example, the command application 240 may request the authentication data such as when a connection is established to a network associated with the third party. Therefore, a first criteria in utilizing the limited control mechanism is an authentication of the third party. The authentication data may be provided in a variety of different manners. For example, the authentication data may be encrypted and the command application 240 may be configured to decrypt the authentication data to validate whether the third party providing the authentication data is an authenticated third party. In another example, the authentication data may be a signed certificate signed by trusted authorities or trusted third parties who are allowed to utilize the limited control mechanism according to the exemplary embodiments. Specifically, the signed certificate operation may be substantially similar to the secure sockets layer (SSL) or transport layer security (TLS) which utilize cryptographic protocols to provide communication security over communications networks. Thus, if the third party provides proper authentication data, the command application 240 may validate the third party. That is, the third party may be predetermined to be authenticated in exercising the limited control. In contrast, if the third party does not provide authentication data or proper authentication data, the command application 240 may reject any attempt by the third party to utilize the limited control mechanism.

The command application 240 may also receive data from the user for the authentication procedure. For example, the data received from the user may be to pre-approve a third party to exercise limited control of the user device 110. The above mechanism through the installation of the command application 240 may enable any third party who provides the proper credentials to utilize the limited control mechanism. Accordingly, the third parties who are entered by the user may be predetermined to be authenticated to exercise the limited control. However, although a compliant user, the user of the user device 110 may still wish to maintain a level of autonomy with particular regard to select third parties. Thus, the user may provide an initial input for a particular third party to be given the limited control. Accordingly, although a further third party may be configured to utilize the limited control mechanism, if the user has not provided the identity of the further third party to the command application 240, the limited control mechanism may be unavailable to the further third party on the user device 110. The identity of the third party may be received in a variety of different manners. For example, the identity may be manually entered by the user via the I/O device 220. In another example, the identity may be received by triggering a receiving operation via the transceiver using the command application 240.

The first criteria described above is the authentication of the third party. According to the exemplary embodiments, a second criteria for the limited control mechanism may be a location criteria where the limited control mechanism is only enabled while the user device 110 remains within an area of the venue 105. That is, the limited control mechanism is only available to the third party while the user device 110 is disposed in an area of a location associated with the third party. The user device 110 may include a mechanism or execute an application to determine its location while the command application 240 continues to run. The command application 240 may therefore update its location data. The location data may be embodied in a variety of different manners. In a first example, the location may be in coordinates (e.g., latitude, longitude, and radius). In a second example, the location may be based upon a presence of the authentication data. That is, if the command application 240 is capable of receiving the authentication data, the location may be verified. The presence of the authentication data may also incorporate other conditions such as a minimum signal strength in which the authentication data is received. In a third example, a combination of the above manners may be used. The location data may also be updated at a variety of different times. For example, the location data may be updated constantly, at predetermined time intervals (e.g., every minute), at random time intervals, at the triggering of an event (e.g., movement detected via an accelerometer), etc.

The command application 240 may receive the authentication data and may also verify that the user device 110 is disposed in the proper location to enable the limited control mechanism. For example, the authentication data may include the location area or range for the third party associated with the venue 105. In another example, the command application 240 may have received the location area or range (e.g., from the user) for the third party. So long as the user device 110 remains in the area of the venue 105, the third party may continue to utilize the limited control mechanism. That is, when the user device 110 exits the area of the venue 105, the third party may be incapable of utilizing the limited control mechanism. The area of the venue 105 may be embodied as predetermined area data associated with the third party. The area of the venue 105 may be defined, for example, by the third party, using geographic boundaries, etc. Therefore, a comparison of the location data with the predetermined area data may verify whether the user device 110 is in the area of the venue 105 of the third party.

When the command application 240 has validated the third party via the authentication data and has verified that the user device 110 is in the area of the venue 105 associated with the third party, the command application 240 may enable the user device to be controlled by the third party. Specifically, the third party may transmit command data to the user device 110. The command application 240 may receive the command data to be applied to the components, applications, functionalities, and/or operations of the user device 110. As described above, the command data may cause a deactivation or a downgrading of the components, applications, functionalities, and/or operations. For example, the venue 105 may be a theater and the command data may deactivate a phone application, a text application, any sound operation, a camera/video application etc. and may also downgrade an illumination level of the display device 215. In another example, in a customs department of an airport, the command data may disable the use of the user device 110 altogether. In a third example, in a passenger airplane, the command data may automatically deactivate or reactivate a set of applications that may interfere with proper airplane operations at select times.

The command data may also be pre-programmed via the command application 240. That is, the commands included in the command data may be entered prior to any authentication or location verification. With the commands already included for use by the command application 240 corresponding to the third party and predetermined area data, the command application 240 may execute the commands when the third party has been authenticated and the location has been verified. That is, the user device 110 may not be required to receive the command data from the third party.

The above exemplary embodiment of the command data relates to the command data including the commands themselves. That is, the command application 240 may receive the command data, process the command data, and extract the commands to be executed on the user device 110. In another exemplary embodiment, the command data may be utilized in a different manner such that commands may be received subsequent thereto. Specifically, the command data may be used as an initial operation to prepare the user device 110 to receive commands. The command data may be executed by the command application 240 to establish a communication channel with the third party. When the communication channel with the third party has been established (e.g., while the user device 110 remains in the predetermined area), the third party may transmit control data that includes the commands that are to be executed on the user device 110. It is noted that the command application 240 may generate confirmation data to indicate to the third party that the command data has been received and executed on the user device 110. However, the establishment of the communication channel between the user device 110 and the third party may be a constructive confirmation that the command data has been executed.

The control data may include one or more commands to be executed on the user device 110. In a first example, the control data may be received via the communication channel and include a single command that is extracted from the command data to be executed on the user device 110. In a second example, the control data may include a plurality of commands. The plurality of commands may be executed immediately and affect the respective component, operation, functionality, etc. upon execution. However, the commands may also have timing information associated therewith. Specifically, the commands may have order data associated such that a first one or more of the commands is executed at a first time, a second one or more of the commands is executed at a second time, etc. This may apply to scenarios where the user device 110 may be allowed to be used in one manner at a first time with increasing restrictions as time progresses. For example, in a movie theater, the user device 110 may receive the control data including the commands. The commands may indicate that the user device 110 may be utilized in any manner while static advertisements are being shown on the screen. When lights begin to dim (e.g., to show an introduction and previews), a first set of commands may be executed (e.g., dimming of the display device 215, lowering a volume of an audio output component, etc.). When the movie begins, a second set of commands may be executed (e.g., disabling all sounds). In this manner, order data of the commands included in the control data may be executed at predetermined times. It is noted that the control data and/or the commands included therein may be received by the user device 110 in a variety of manners. For example, the control data in its entirety with all commands and order data may be received in a single transmission upon establishing the communication channel. In another example, the control data may include a plurality of control data with each control data including a set of the commands to be executed. Thus, upon receiving each control data which may be received based upon the order data, the command application 240 may execute the received control data.

It should be noted that the above noted applications each being an application (e.g., a program) executed by the processor 205 is only exemplary. The functionality associated with the applications may also be represented as components of one or more multifunctional programs, a separate incorporated component of the user device 110 or may be a modular component coupled to the user device 110, e.g., an integrated circuit with or without firmware.

The memory 210 may be a hardware component configured to store data related to operations performed by the user device 110. Specifically, the memory 210 may store data related to the command application 240. For example, as described above, the command application 240 may receive identities of third parties to verify the authentication of the third party to enable commands to be received from the control server 135 of the third party. Accordingly, the memory 210 may be used to store the identity data of the third parties. In another example, the command application 240 may receive the location and area of the third party that is associated with the third party. Accordingly, the memory 210 may be used to store the location data of the third parties.

The display device 215 may be a hardware component configured to show data to a user, while the I/O device 220 may be a hardware component that enables the user to enter inputs. It should be noted that the display device 215 and the I/O device 220 may be separate components or integrated together such as a touchscreen. The display device 215 may include an illumination feature in which a setting for the display device 215 via general settings of the user device 110 or based on a running application sets a brightness of the display device 215. The display device 215 may be used at any time the user is utilizing the user device 110 as well as for other operations related to running the various applications installed on the user device 110. The audio device 230 may be a hardware component configured to receive audio or play audio to a user. For example, the audio device 230 may be an audio arrangement including a microphone and a speaker. The audio device 230 may be used at any time an application requiring an audio component to be used. The audio device 230, particularly a speaker, may have a volume level associated therewith that sets a loudness of audio being played.

The transceiver 225 may be a hardware component configured to transmit and/or receive data. That is, the transceiver 225 may enable the communication with other electronic devices directly or indirectly through a network or other communications medium. The transceiver 225 may operate on a variety of different frequencies or channels (e.g., set of consecutive frequencies) that are related to the functionalities of the different applications being performed. As will be described in detail below, the transceiver 225 may be a transceiver arrangement including one or more transceiving components configured to exchange data over at least one of near field communications (NFC), BlueTooth, BlueTooth Low Energy (iBeacon), WiFi, cellular frequencies, etc.

The access point 115 may be a first type of mechanism in which the authentication data may be transmitted to the user device 110. Specifically, the access point 115 may have an associated broadcast zone such that when the user device 110 is in the broadcast zone of the access point 115, the authentication data may be transmitted to the user device 110. The broadcast zone may be partially or wholly disposed in an area of the venue 105 embodied in the communications network 120. As noted above, the transceiver 225 of the user device 110 may be configured to exchange data using a variety of different connection types including BlueTooth, iBeacon, WiFi, cellular, etc. The communications network 120 may therefore utilize any of these different connection types. The access point 115 may accordingly be embodied in a variety of different manners corresponding to the different connection types being utilized. For example, the access point 115 may be a BlueTooth transceiver, a router, a server, a network management arrangement, a cellular tower, etc.

It should be noted that the different types of connections utilized by the access point 115 and the communications network 120 may utilize an association procedure. Specifically, the user device 115 may establish a connection with the communications network 120. Using a handshake procedure or a substantially similar procedure, the user device 115 may connect to the communications network 120. During the association procedure or thereafter, the control server 135 via the access point 115 may transmit the authentication data. However, it is noted that an explicit connection may not be required for the mechanism according to the exemplary embodiments to be performed. As will be described in further detail below, a broadcasting feature may be used where no explicit connection between the user device 115 and the enterprise is established.

The exemplary embodiment of the system 100 illustrates when the communications network 120 is wholly within the area of the venue 105. In such a scenario, the broadcast zone of the communications network 120 may always satisfy the location criteria as the entirety of the communications network 120 is in the area of the venue 105 and the location criteria is bound by the area of the venue 105. However, the configuration of the communications network 120 being wholly within the area of the venue 105 is only exemplary. For example, the communications network 120 may extend beyond the borders of the area of the venue 105. That is, the communications network 120 may be partially within the area of the venue 105. In another example, an entirety of the area of the venue 105 may be disposed within the communications network 120. That is, the communications network 120 may have a broadcast zone greater than the area of the venue 105. However, in such a scenario, the limited control mechanism may still only be capable of being utilized while the user device 110 is in the area of the venue 105. That is, if the user device 110 is still in the broadcast zone of the communications network 120 and capable of receiving the authentication data but outside the area of the venue 105, the third party may not be capable of using the limited control mechanism as one of the criteria is no longer satisfied. Therefore, the location criteria remains to be within an area of the venue 105 and is not defined by the broadcast zone of the communications network 120.

Via the communications network 120, the above described exemplary embodiment may be utilized in which the command data may be transmitted to include the command itself or as a preliminary operation of a command to be performed by the user device 110 (e.g., to establish the communication channel). Accordingly, the communication channel may be a feature of the communications network 120 in which command data, control data, order data, confirmation data, etc. may be exchanged between the control server 135 and the user device 110.

The beacon device 125 may be a second type of mechanism in which the authentication data may be transmitted to the user device 110. Specifically, the beacon device 125 may represent any near field communication (NFC) mechanism. In a substantially similar manner as the access point 115, the beacon device 125 may have an associated broadcast zone such that when the user device 110 is in the broadcast zone of the beacon device 125, the authentication data may be transmitted to the user device 110. The broadcast zone may be partially or wholly disposed in an area of the venue 105 embodied in the beacon area 130. The beacon device 125 may accordingly be embodied in a variety of different NFC manners. For example, the beacon device 125 may be a NFC tag. As those skilled in the art will understand, the NFC tag may be a device that is capable of transmitting authentication data to a receiving device such as the user device 110 when in a proximity of the beacon device 125 (i.e., within the beacon area 130). In another example, the beacon device 125 may be a radio frequency identification (RFID) tag. Specifically, the RFID tag may be an ultra high frequency (UHF) RFID tag in either a passive or active mode. In a substantially similar manner as the NFC tag, the RFID tag may transmit the authentication data to the user device 110 when in proximity. The NFC tag and the RFID tag may be configured to continuously transmit the authentication data (and the command data) so that the command application 240 on the user device 110 may receive the authentication data whenever within a receiving proximity to the beacon device 125.

The exemplary embodiment of the system 100 illustrates when the beacon area 130 is wholly within the area of the venue 105. However, in a substantially similar manner as the communications network 120, the broadcast zone of the beacon area 125 may always satisfy the location criteria as the entirety of the beacon area 125 is in the area of the venue 105 and the location criteria is bound by the area of the venue 105. However, the configuration of the beacon area 125 being wholly within the area of the venue 105 is only exemplary and may be modified in a substantially similar manner as the communications network 120 as described above.

The beacon device 125 may also be embodied in further mechanisms. The NFC tag and the RFID tag described above provide mechanisms in which the user device 110 is only required to be located within range of the broadcast zone. Once in the broadcast zone of the beacon area 130, the transceiver 225 of the user device 110 may listen and receive the data being transmitted by the beacon device 125. That is, from the perspective of the user, the beacon device 125 being a NFC tag or RFID tag provides a passive mechanism for the authentication data (and the command data) to be received. However, this is only exemplary and an active or manual mechanism may also be utilized. For example, the beacon device 125 may be a barcode (e.g., 1-dimensional barcode, 2-dimensional barcode, color barcode, etc.) or other scannable string. Accordingly, an imager on the user device 110 may be used to scan the barcode to receive the authentication data and stored therein. In another example, the beacon device 125 may be an infrared based mechanism which provides a further short range transmission mechanism to receive the authentication data.

It is noted that the communications network 120 or the beacon device 125 being utilized to transmit the authentication data (and also command data) is only exemplary. That is, the venue 105 may utilize a combination of these transmission mechanisms or may utilize further types of transmission mechanisms. The exemplary embodiments may utilize any manner of transmitting the authentication data to the user device 110. For example, the third party may enable the user device 110 to establish a connection to the control server 135 or the access point 115 using a wired connection.

Figure 3:
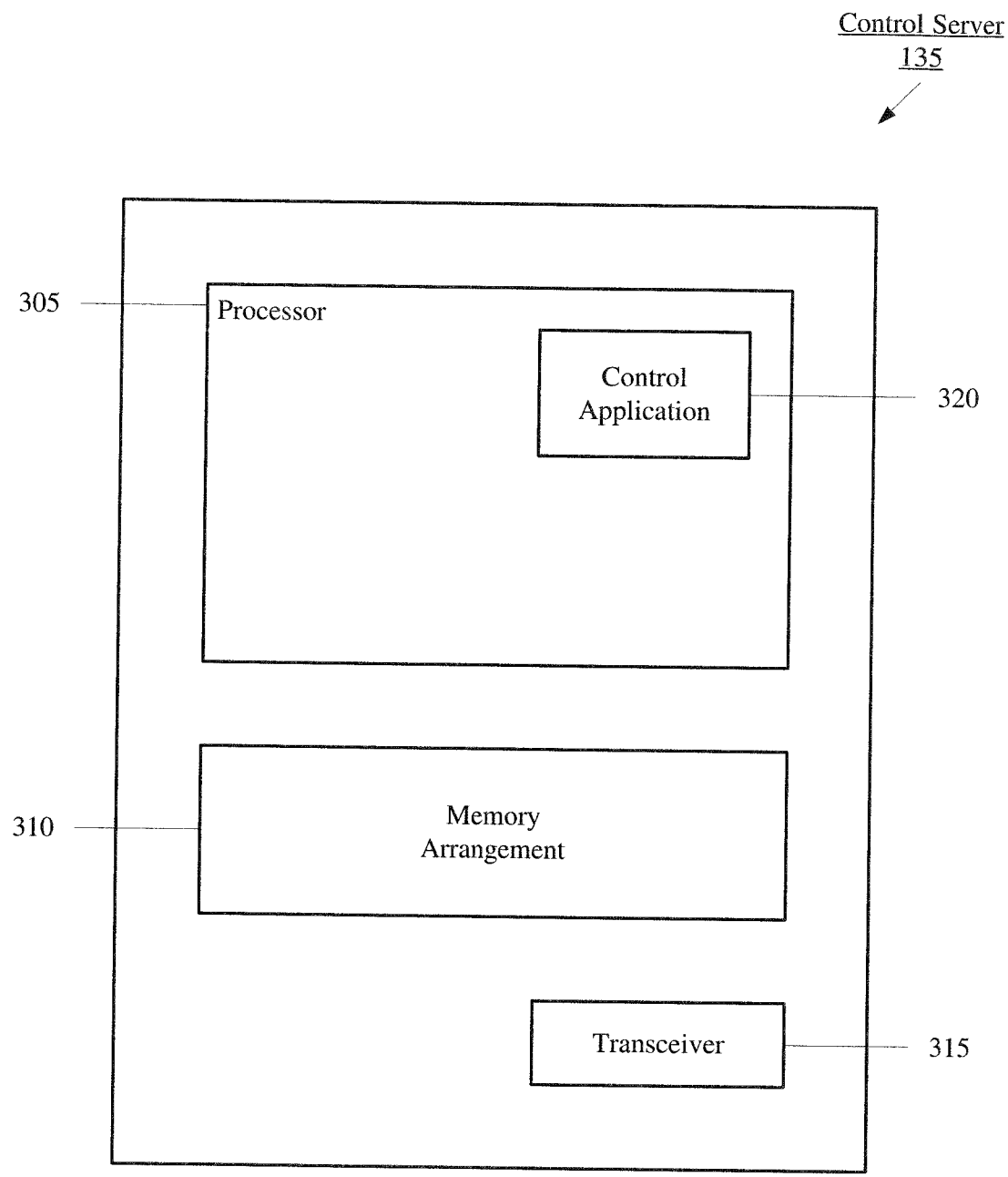
FIG. 3 shows an exemplary control server of the system of FIG. 1 according to the present disclosure.

The control server 135 may be a component controlled by the third party setting the policies for usage of electronic devices while in the area of the venue 105. FIG. 3 shows an exemplary embodiment of the control server 135 of the system of FIG. 1 according to the present disclosure. The control server 135 may represent any electronic device that is configured to perform the functionalities and mechanisms described herein. As shown in FIG. 3, the control server 135 may include a processor 305, a memory arrangement 310, and a transceiver 315. The processor 305 may execute a plurality of applications, the memory arrangement 310 may store data related to the applications (e.g., performing the functionality of a read access memory (RAM)), and the transceiver 315 may transmit data to the user device 110 via the access point 115 and/or the beacon device 125.

It should be noted that the control server 135 may also include further components such as a display device and an I/O device that enable an administrator to configure the control server 135 to perform its intended functionalities and mechanisms. However, it should also be noted that the control server 135 may be configured to receive these instructions via the transceiver 315 to automatically implement the policies upon reception. The configuration of the control server 135 may include providing inputs to indicate desired deactivation and/or downgrading of components, applications, functionalities, and/or operations of the user device 110 while in the area of the venue 105 (e.g., mute all sound). The administrator may accordingly provide inputs reflecting the desired commands to be transmitted to the user device 110. The administrator may also provide inputs regarding the authentication data such that the authentication data remains proper for usage with the limited control mechanism.

The control server 135 is illustrated as being within the venue 105. However, the disposition of the control server 135 in the venue 105 is only exemplary. In another exemplary embodiment, the control server 135 may be disposed in any location (e.g., outside the venue 105). The control server 135 may have established a connection with access point 115 and the beacon device 125 through any known mechanism such as a further communications network in which the access point 115 and the beacon device 125 may be connected.

The processor 305 may be configured to execute a control application 320. The control application 320 may provide a third party side operation interacting with the user device 110 to perform the limited control mechanism according to the exemplary embodiments. The control application 320 may be configured to transmit the authentication data to the user device 110 and subsequently command data to the user device 110.

As noted above, the user device 110 may have the command application 240 installed and running. Thus, for the description herein for the control server 135, it may be assumed that the user device 110 is available for the limited control mechanism to be utilized by the control server 135. For the limited control mechanism to be utilized by the control server 135, the control application 320 may be used to generate the authentication data and the command data. As noted above, the administrator for the third party may have prepared the authentication data and the command data. Specifically, the authentication data may be an encrypted data file with an identity of the third party, a signed certificate, etc. The command data may be configured and formatted to be received and utilized by the command application 110. For example, the command application 110 may differ between user devices (e.g., operating system of the user device). Accordingly, in a first exemplary embodiment, the authentication data and/or the command data may be formatted accordingly and be transmitted to the user device 110. In another exemplary embodiment, the control server 135 may have different versions of the authentication data and/or the command data and broadcast each version for the user device 110 to receive the appropriate version. In a further exemplary embodiment, the command application 240 may operate in identical manners independent of the characteristics of the user device 110 (e.g., the operating system). Therefore, the control server 135 may utilize a single type and version of the authentication data and/or the command data for use in the limited control mechanism.

With regard to the communications network 120, the control server 135 may provide the authentication data to the access point 115 for delivery to the user device 110. Specifically, when the user device 110 has established a connection to the communications network 120, the access point 115 and/or the control server 135 is aware that the user device 110 has established this connection. During the association procedure, the user device 110 may have provided identification information including characteristics (e.g., operating system version) to the access point 115. Accordingly the control server 135 may package the authentication data for delivery to the user device 110. While within the area of the communications network 120, upon receiving the authentication data, the command application 240 of the user device 110 may determine whether the third party of the venue 105 in which the user device 110 is disposed is a valid third party to utilize the limited control mechanism. During or after this validation procedure performed by the user device 110, the control server 135 may also package the command data for delivery to the user device 110. Upon receiving the command data, the command application 240 of the user device 110 may execute the commands included in the command data (upon validation of the third party and verification of the location).

With regard to the beacon device 125, the control sever 135 may provide the authentication data and the command data to the beacon device 125 for delivery to the user device 110. Specifically, the authentication data and the command data may continuously or on an interval (e.g., regular or irregular) broadcast the authentication data and the command data within the beacon area 130. While within the area of the beacon area 130, upon receiving the authentication data, the command application 240 of the user device 110 may determine whether the third party is a valid third party to utilize the limited control mechanism. The user device 110 may have already received or subsequently receive the command data from the beacon device 125. Upon receiving the command data, the command application 240 of the user device 110 may execute the commands included in the command data (upon validation of the third party and verification of the location).

The control application 320 may be configured to receive inputs from an administrator or other source associated with the third party. The inputs may correspond to the commands to be executed on the user device 110. Thus, the control application 320 may convert the inputs into corresponding commands included in the command data. The control application 320 may also convert the inputs into corresponding commands included in the control data when the command data is configured for the initial operation. The control application 320 may further receive further commands and order data that may apply to the commands to be included in the command data or the control data.

It should be noted that the above noted applications each being an application (e.g., a program) executed by the processor 305 is only exemplary. The functionality associated with the applications may also be represented as components of one or more multifunctional programs, a separate incorporated component of the control server 135 or may be a modular component coupled to the control server 135, e.g., an integrated circuit with or without firmware.

The exemplary embodiments described above relate to the user device 110 listening for the data being broadcast from the control server 135. That is, for discovery purposes, the control server 135 operates in a passive manner and the user device 110 operates in an active manner. However, this configuration is only exemplary. According to another exemplary embodiment, for discovery purposes, the control server 135 may operate in an active manner and the user device 110 may operate in a passive manner. Specifically, the control server 135 may be configured to detect the user device 110. For example, the user device 110 may include a background operation to detect networks where the user device 110 is disposed. This detection process may include a signal transmitted from the user device 110. Accordingly, this passive operation of the user device 110 may enable the control sever 135 to detect the user device 110 (e.g., when exchanging the signal with the access point 115). In another example, the third party may deploy sensors to detect the user device 110 while within the area of the venue 105. Accordingly, the control server 135 may be provided information indicating the presence of the user device 110 from the sensors. After the discovery process, the exchange of the authentication data and the command data may proceed in a substantially similar manner as described above. In a further example, the association procedure between the user device 110 and the control server 135 may relate to a discovery process in which the control server 135 operates in an active manner in contrast to the more passive manner described above.

As described above, the limited control mechanism may include a plurality of restriction types. The above describes the manner in which there is a geographic restriction as the user device 110 must satisfy the location criteria of being in the area of the venue 105. The above also describes the manner in which there is a functionality restriction as the control server 135 may only provide commands for selected components, applications, functionalities, and/or operations (although a command to disable the user device 110 is also possible). The above also impliedly describes the manner in which there is a time restriction. That is, the limited control mechanism may be restricted by time as this capability is only enabled during the time in which the user device 110 remains in the area of the venue 105. However, the limited control mechanism may also utilize further time restrictions. Specifically, the command data may also be associated with a timer.

The timer for the use of the commands may be utilized in a variety of manners. In a first example, the command data may be associated with an immediate timer that begins running upon the command data being received and executed on the user device 110. Specifically, the user device 110 may have validated the third party and verified the location. The user device 110 may receive the command data and perform the commands included therein. The timer may also begin at this time. Thus, upon exiting the area of the venue 105 or upon expiry of the immediate timer, the limited control that the third party has on the user device 110 may be released for full control to be returned to the user. However, it is noted that the control server 135 may transmit the command data again and restart the timer. In a second example, the command data may be associated with a delayed timer that begins running at a predetermined time. It should be noted that the predetermined time may be associated with an event occurring. Thus, although described as a delayed timer, the event may have occurred at a time prior to receiving the command data. In such a scenario, the timer value may be adjusted accordingly. This may also coincide with the execution of the commands included in the command data although already received (and stored in the memory arrangement 210 of the user device 110). Specifically, the user device 110 may have validated the third party and verified the location. The user device 110 may receive the command data and upon processing the command data, the delayed timer may be determined and execution of the commands may also be delayed upon the start of the delayed timer. For example, when the venue 105 is a theater, the commands may be executed on the user device 110 only upon the lights dimming or the show starting. Upon expiry of the delayed timer or any time the mobile device exits the area of the venue 105, the limited control that was given to the third party may be returned to the user.

It is noted that because the user device 110 may exit from the area of the venue 105, the control server 135 or the command data may utilize further mechanisms to ensure that the limited control is maintained whenever the user device 110 returns the area of the venue 105. For example, with no timer value associated with the command data, the control server 135 may always transmit the authentication data and the command data whenever the user device 110 enters the area of the venue 105. In another example, with a timer value associated with the command data, the command application 240 may resume the limited control by the third party if the user device 110 returns to a position within the area of the venue 105 and the timer has a duration remaining.

Whether the command application 240 is installed voluntarily or utilized by being pre-installed, the control application 320 or the command application 240 may provide a feature that indicates to the user the type of limited control that the third party is exercising on the user device 110 whenever the limited control mechanism is being utilized. In a first example, the command application 240 may determine the commands to be executed in the command data and generate an indicator display on the display device 215 that illustrates how the applications, components, functionalities, and operations have been deactivated or downgraded. In a second example, the control application 320 may generate the indicator display and include a command in the command data for the indicator display to be shown on the display device 215 that illustrates how the applications, components, functionalities, and operations have been deactivated or downgraded.

Figure 4:
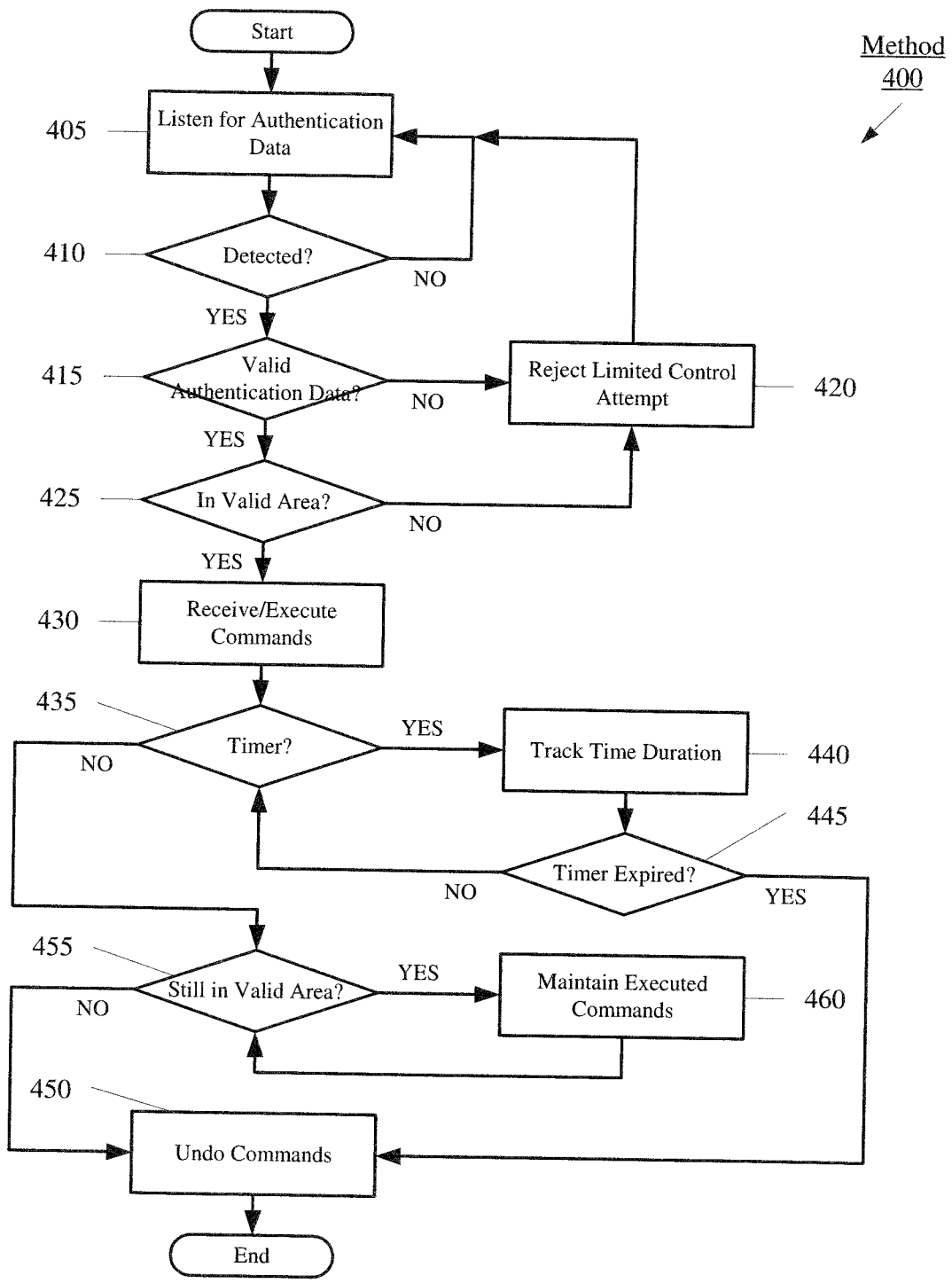
FIG. 4 shows an exemplary method performed by a user device for receiving commands from a control server according to the present disclosure.

FIG. 4 shows an exemplary embodiment of a method 400 performed by the user device 110 for receiving commands from the control server 135 according to the present disclosure. Specifically, the method 400 may relate to the operations from the perspective of the user device 110 for the limited control mechanism. The method 400 also relates to when the discovery process is configured with the user device 110 operating in an active manner and the control server 135 operating in a passive manner. However, it is again noted that this is only exemplary and a different configuration may be used. The method 400 will be described with regard to the system 100 of FIG. 1 and the user device 110 of FIG. 2.

In step 405, the user device 110 listens for authentication data that is being broadcast. As described above, the user device 110 may include the transceiver 225. The transceiver 225 may be an arrangement that is configured to utilize a variety of different types of transmission mechanisms (e.g., WiFi, cellular, etc.). With the command application 240 running, the transceiver 225 may be used to listen for authentication data that is being broadcast. The authentication data may also be broadcast in a representative manner. Specifically, a discovery signal from the access point 115 may provide an indication that the authentication data is available.

In step 410, the user device 110 determines whether the authentication data is detected or a broadcast signal representing the authentication data is detected. If no data is detected, the user device 110 returns to step 405 to continue listening for the authentication data. However, if the authentication data is detected, the user device 110 continues the method 400 to step 415. It should be noted that the authentication data may have been received by being broadcast using, for example, the beacon device 125 in the beacon area 130 of the venue 105. The broadcast signal representing the authentication data may have been received by being broadcast using, for example, the access point 115 in the communications network 120 of the venue 105. Thus, it may be assumed that if the broadcast signal representing the authentication data is received, the user device 110 may associate with the access point 115 to establish a connection with the communications network 120. Thereafter, the user device 110 may receive the authentication data from the control server 135 via the access point 115.

In step 415, the user device 110 validates the third party using the authentication data. The validation of the third party may provide the first criteria for enabling the limited control mechanism. As described above, the validation of the third party may be performed using a variety of mechanisms including a signed certificate, encrypted data, etc. Thus, for a signed certificate, the certificate and the signature may be verified by the command application 110 to validate the third party. For encrypted data, a key may be used to decrypt the encrypted data (which was encrypted using a corresponding key) for the command application 110 to validate the third party. If the authentication data provided by the third party is not valid, the user device 110 continues the method 400 to step 420 where the attempt at utilizing the limited control mechanism is rejected. The user device 110 may return to step 405 to continue listening for authentication data. As noted above, the validation of the third party may be based on a general verification procedure of the command application 110 or through a list of pre-approved third parties provided by the user of the user device 110.

If the authentication data validates the third party, the user device 110 continues the method 400 to step 425. In step 425, the user device 110 verifies whether the user device 110 is in a valid area. The verification of the location may provide the second criteria for enabling the limited control mechanism. As described above, the location of the user device 110 may be determined using a variety of mechanisms including a longitude/latitude (e.g., GPS, triangulation, etc.), a signal strength of the authentication data being received, a direction from which the authentication data is being received, etc. The authentication data that was provided may include information regarding the bounds of the area of the venue 105 or a minimum required signal strength. In another example, the user may have provided the area for the third party associated with the authentication data. If the location is verified, the user device 110 continue the method 400 to step 420 where the attempt at utilizing the limited control mechanism is rejected.

If the authentication data is used to validate the third party and the location has been verified, the user device 110 continues the method 400 to step 430. In step 430, the user device 110 receives the command data. As noted above, with the beacon device 125, the command data may be broadcast and received at any time by the user device 110. With the communications network 120, the command data may be received during or after the association procedure or during or after the authentication data is received. As the third party has been validated and the location verified, the commands included in the command data may be executed for the third party to perform the limited control mechanism on the user device 110. As noted above, the commands may have a functionality restriction in which select components, applications, functionalities, and/or operations are deactivated or downgraded into another state.

In step 435, the user device 110 determines whether a timer value is associated with the command data. As noted above, the time restriction of the limited control mechanism may be based upon whenever the user device 110 remains in the area of the venue 105. However, the command data may also have a timer associated with the commands. If there is a timer, the user device 110 continues the method 400 to step 440. In step 440, the user device 110 tracks the time duration. As noted above, the timer may be an immediate timer or a delayed timer. The time duration of the timer may be tracked when the timer has been initiated. In step 445, the user device 110 determines whether the timer has expired. If still running, the user device 110 returns the method 400 to step 435. However, if the timer has expired, the user device 110 continues the method 400 to step 450. In step 450, the expiry of the timer supercedes the valid third party and location verification. Thus, the commands that were executed on the user device 110 are undone.

Returning to step 435, if there is no timer, the user device 110 continues the method 400 to step 455. In step 455, the user device 110 continues to determine whether the user device 110 remains in a verified location of the venue 105. As noted above, this may also correspond to the time restriction. If the user device 110 is still in the verified location, the user device 110 continues the method 400 to step 460 where the executed commands are maintained. However, if the user device 110 is no longer in the verified location, the user device 110 continues the method 400 to step 450 where the commands are undone.

It is noted that the steps of the method 400 may be modified into various different configurations. Specifically, the ordering of the steps and the performing of the steps may be modified. For example, as described above, the timer analysis (of step 435) and the valid area analysis (of step 455) may be performed in different manners. In a first example, the timer analysis and the valid area analysis may be performed as shown in the method 400 where the timer analysis is first performed. In a second example, the timer analysis and the valid area analysis may be performed in a reverse order where the valid area analysis is first performed. In a third example, the timer analysis and the valid area analysis may be performed in parallel (from step 430).

It is again noted that the commands being undone may be re-executed if certain conditions are met. For example, the user device 110 may exit out of the verified location of the venue 105 but later return to the verified location. Accordingly, the user device 110 may re-execute the commands included in the command data. Specifically, the control server 135 and the command application 240 may rerun the steps of the method 400. In another example, the command data may have a timer associated and the timer may still be running. If the user device 110 exits the verified location but returns to the verified location while the timer is still running, the command application 240 may simply re-execute the commands included in the command data without having to perform the previous steps of the method 400.

As noted above, the method 400 is described with regard to the discovery process utilizing a configuration in which the user device 110 operates in an active manner and the control server 135 operates in a passive manner. However, It should again be noted that this configuration is only exemplary. As described above, an opposite configuration may be utilized where steps of the method 400 may be modified. For example, the user device 110 may be detected by the control server 135 (e.g., via the beacon device 125 or the access point 115). The control server 135 may push the authentication data to the user device 110. With the command application 240 running on the user device 110, the authentication data may be received. That is, the user device 110 may remain passive until the authentication data is received.

It should also be noted that the active manner in which the user device 110 operates may also incorporate actions performed by the user. For example, with a barcode or other scannable object, step 405 may utilize a different operation in which the user utilizes an imager of the user device 110 to scan the barcode/object to receive the authentication data and the command data. The user device 110 may accordingly perform the remaining steps of the method 400 (e.g., step 425 onward).

Figure 5:
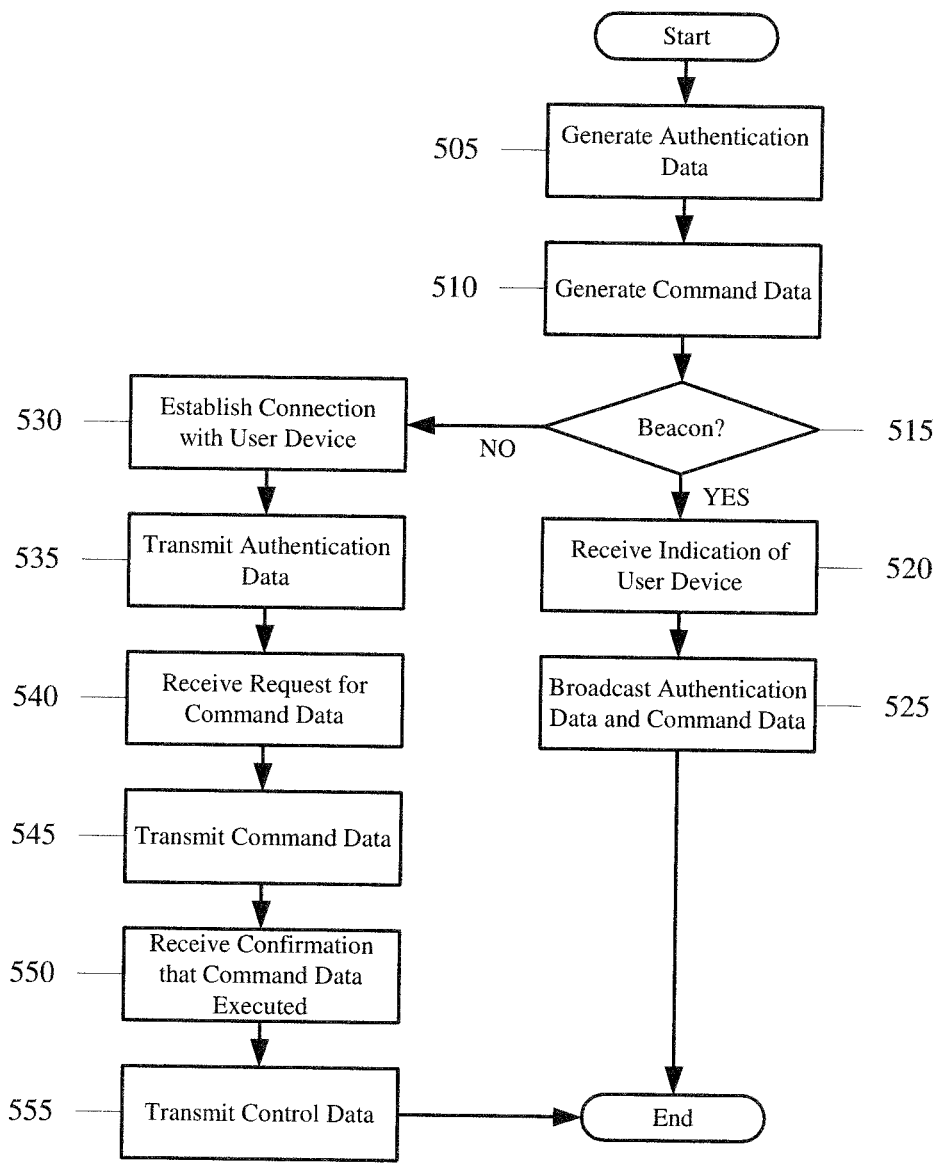
FIG. 5 shows an exemplary method performed by a control server for transmitting commands to a user device according to the present disclosure.

FIG. 5 shows an exemplary embodiment of a method 500 performed by the control server 135 for transmitting commands to the user device 110 according to the present disclosure. Specifically, the method 500 may relate to the operations from the perspective of the control server 135 for the limited control mechanism. The method 500 also relates to when the discovery process is configured with the user device 110 operating in an active manner and the control server 135 operating in a passive manner. However, it is again noted that this is only exemplary and a different configuration may be used. The method 500 will be described with regard to the system 100 of FIG. 1 and the control server 135 of FIG. 3.

In step 505, the control server 135 generates the authentication data. As noted above, the authentication data may utilize a variety of different validation mechanisms including signed certificates or encryptions. Thus, the control server 135 may generate the authentication data accordingly. The control server 135 may also generate the authentication data according to various settings of the user device 110 including the operating system, a version, a platform, etc.

In step 510, the control server 135 generates the command data for the user device 110. As described above, the command data may be generated in a variety of manners. In a first example, the command application 240 may utilize a common format and type of command data independent of the user device 110 and settings on the user device 110. Thus, the control server 135 may generate a single type of command data. In a second example, the command application 240 may differ from one user device to another based on the settings thereof. Thus, the control server 135 may generate various versions of the command data. However, the commands themselves included in the command data may represent the same overall set of commands to be performed on each user device 110. It is also noted that the command data may include general instructions for the commands and the command application 240 may be configured to execute the commands according to the settings of the user device.

In step 515, the control server 135 determines whether the authentication data and the command data are to be communicated to the user device 110 using the beacon device 125. As described above, the third party may utilize the beacon device 125 and/or the communications network 120. Based on the type of communication mechanism, the control server 135 may prepare the transmission of the data accordingly.

If the third party utilizes the beacon device 125, the control server 135 continues the method 500 to step 520. In step 520, the control server 135 receives an indication that the user device 520 is present within the predetermined area of the venue 105. As described above, the indication may be provided in a variety of different manners such as sensors. Thus, in step 525, the control server 135 broadcasts the authentication data and the command data to the user device 110 in the predetermined area of the third party. It should be noted that the control server 135 may not directly broadcast the authentication data but provide the authentication data to components for the broadcasting to be performed. Specifically, the control server 135 may provide the authentication data to the beacon device 125. The authentication data and the command data may be broadcast in different manners. For example, the beacon device 125 may broadcast the authentication data and the command data in a single data package for transmission. In another example, the beacon device 125 may broadcast the authentication data and the command data as separate data packages.

It is noted that the method 500 is described with regard to an indication of the presence of the user device 520 being used. However, the use of the indication is only exemplary. As described above, the third party via the beacon device 125 may be configured to constantly broadcast the authentication data and the command data for any user device 110 that may be in the predetermined area or entering the predetermined area.

If the third party utilizes the communications network 120, the control server 135 continues the method 500 to step 530. In step 530, the third party establishes a connection with the user device 110. Specifically, the user device 110 associates with the access point 115. When the user device 110 has established a connection with the access point 115, in step 535, the control server transmits the authentication data to the user device 110 via the connection. It should again be noted that the control server 135 may not directly transmit the authentication data but provide the authentication data to components for the broadcasting to be performed. Specifically, the control server 135 may provide the authentication data to the access point 115.

In step 540, the control server 135 receives a request for the command data. Specifically, the user device 110 may have received the authentication data and verified that the third party is authorized for the limited control mechanism. Thus, the request for the command data may be a constructive indication that the authentication data has been received and the third party is authorized. It should be noted that the user device 110 may transmit explicit confirmation data that the authentication data has been received and indicate that the third party is approved to transmit command data. In step 545, the control server 135 transmits the command data to the user device 110.

In step 550, the control server 135 receives confirmation data that the command data has been executed from the user device 110. The confirmation data may relate to when the command data is used to perform a preliminary operation in establishing a communication channel for delivery of commands. Thus, in step 555, the control server transmits the control data to the user device 110 via the established communication channel. However, as described above, the command data may also include the commands themselves. Thus, the method 500 may terminate upon transmitting the command data.

It should be noted that the method 500 is described with regard to using the beacon device 125 or the communications network 120. However, as described above, the third party may utilize both the beacon device 125 and the communications network 120. Thus, the control server 135 may perform the method 500 in its entirety to prepare the broadcasting of the authentication data and the command data via the beacon device 125 and the transmitting of the authentication data and the command data via the communications network 120.

It is also noted that the method 500 may include further steps. For example, the command data may have order data or timer data associated therewith. Thus, appropriate inputs associated therewith may be received by the control server 135 to generate the command data or control data accordingly or as a separate data package.

As noted above, the method 500 is described with regard to the discovery process utilizing a configuration in which the user device 110 operates in an active manner and the control server 135 operates in a passive manner. However, It should again be noted that this configuration is only exemplary. As described above, an opposite configuration may be utilized where steps of the method 500 may be modified. For example, an initial step in the method 500 may be for the control server 135 to detect the user device 110 entering the area of the venue 105. As described above, the control server 135 may detect the user device 110 using a variety of different mechanisms (e.g., association procedure with the access point 115, sensors, etc.). As the control server 135 may perform the discovery of the user device 110, the authentication data and the command data may be pushed to the user device 110 (in contrast to being broadcast).

The exemplary embodiments provide a device, system, and method for a third party to exert a limited control over components, applications, functionalities and/or operations of a user device. Specifically, the limited control may only require that a command application be installed and running on the user device. That is, the limited control may be exercised without any user intervention. The limited control may be enabled upon a first criteria of the third party being validated and a second criteria of a location being verified. The limited control may be restricted in a variety of manners including a time restriction, a location restriction, and a functionality restriction.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation. Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
responsive to receiving, by a control server of a third party, an indication that a user device is in a predetermined area:
transmitting, by the control server, authentication data to the user device, the authentication data configured to authenticate the third party to the user device, the third party being associated with the predetermined area;
after transmitting the authentication data, receiving, by the control server, a request from the user device for command data, the command data configured to be executed on the user device to prepare the user device to receive commands that provide the third party with a limited control over the user device while the user device remains in the predetermined area, wherein the request indicates that the user device used the authentication data to validate the control server for control over user device;

in response to the request, transmitting, by the control server, the command data to the user device, wherein the user device executes the command data; and after transmitting the command data, transmitting, by the control server to the user device, control data comprising at least one command to be executed on the user device.

2. The method of claim 1, wherein receiving the indication comprises:

receiving, by the control server, location data of the user device from an access point associated with the third party, the user device having associated with the access point to join a communications network of the third party; and determining, by the control server, that the user device is in the predetermined area based on the location data.

3. The method of claim 2, wherein the location data is a signal strength, and wherein the signal strength being above a predetermined threshold indicates that the user device is in the predetermined area.

4. The method of claim 1, further comprising:

receiving, by the control server, confirmation data from the user device, the confirmation data being indicative of the user device executing the command data.

5. The method of claim 1, wherein receiving the indication comprises:

receiving, by the control server, indication data from a sensor associated with the third party, the indication data indicating that the user device is in the predetermined area.

6. The method of claim 1, wherein the command data comprises an activation, an upgrade, a deactivation, a downgrade, or a combination thereof of a component, an application, a functionality, an operation, or a combination thereof of the user device.

7. The method of claim 1, further comprising:

establishing, by the control server, a communication channel with the user device based on the user device executing the command data; and transmitting, by the control server, the control data to the user device via the communication channel.

8. The method of claim 7, further comprising:

receiving, by the control server, order data indicative of a predetermined order in which a plurality of commands are to be executed by the user device, wherein the predetermined order increases restrictions on the user device as time progresses;

generating, by the control server, the control data based on the order data.

9. The method of claim 1, wherein the authentication data is an encrypted data, a signed certificate, or a combination thereof.

10. A control server of a third party, comprising:

a transceiver configured to communicate with a user device and receive an indication that the user device is in a predetermined area, the third party being associated with the predetermined area;

a memory arrangement storing authentication data and command data, the authentication data configured to authenticate the third party to the user device, the command data configured to be executed on the user device to prepare the user device to receive commands that provide the third party with a limited control over the user device while the user device remains in the predetermined area; and a processor coupled to the transceiver and the memory arrangement, wherein, responsive to the receipt of the indication, the processor is configured to:

instruct the transceiver to transmit the authentication data to the user device, after the transceiver transmits the authentication data, instruct the transceiver to receive a request from the user device for the command data, wherein the request indicates that the user device used the authentication data to validate the control server for control over user device, in response to the request, instruct the transceiver to transmit the command data to the user device, wherein the user device executes the command data; and after the transceiver transmits the command data, instruct the transceiver to transmit control data comprising at least one command to be executed on the user device.

11. The control server of claim 10, wherein the processor is further configured to instruct the transceiver to receive the indication by instructing the transceiver to receive location data of the user device from an access point associated with the third party, the user device having associated with the access point to join a communications network of the third party, and wherein the processor is further configured to determine that the user device is in the predetermined area based on the location data.

12. The control server of claim 11, wherein the location data is a signal strength, and wherein the signal strength being above a predetermined threshold indicates that the user device is in the predetermined area.

13. The control server of claim 10, wherein the processor is further configured to instruct the transceiver to receive confirmation data from the user device, the confirmation data being indicative of the user device executing the command data.

14. The control server of claim 10, wherein the processor is further configured to instruct the transceiver to receive the indication by instructing the transceiver to receive indication data from a sensor associated with the third party, the indication data indicating that the user device is in the predetermined area.

15. The control server of claim 10, wherein the command data comprises an activation, an upgrade, a deactivation, a downgrade, or a combination thereof of a component, an application, a functionality, an operation, or a combination thereof of the user device.

16. The control server of claim 10, wherein the processor is further configured to instruct the transceiver to establish a communication channel with the user device based on the user device executing the command data and transmit the control data to the user device via the communication channel.

17. The control server of claim 16, wherein the processor is further configured to instruct the transceiver to receive order data indicative of a predetermined order in which a plurality of commands are to be executed by the user device, wherein the predetermined order increases restrictions on the user device as time progresses, and wherein the processor is further configured to generate the control data based on the order data.

18. The method of claim 10, wherein the authentication data is an encrypted data, a signed certificate, or a combination thereof.

19. A method, comprising:
generating, by a control server of a third party, authentication data, the authentication data configured to authenticate the third party to a user device;
generating, by the control server, command data, the command data configured to be executed on the user device to prepare the user device to receive commands that provide the third party with a limited control over the user device while the user device remains in a predetermined area, the third party being associated with the predetermined area and the predetermined area being included in a broadcast zone of a communication network used by the control server;
broadcasting, by the control server into the broadcast zone, the authentication data and the command data for the user device that is in the predetermined area to receive the authentication data and the command data, wherein the user device executes the command data;
receiving a confirmation, in the control server from the user device, that the user device used the authentication data to validate the control server for control over user device; and
generating and transmitting, by the control server to the user device, control data comprising at least one command to be executed on the user device.

20. The method of claim 19, further comprising:
receiving, by the control server, indication data from a sensor associated with the third party, the indication data indicating that the user device is in the predetermined area.

* * * * *